Patented Oct. 20, 1953

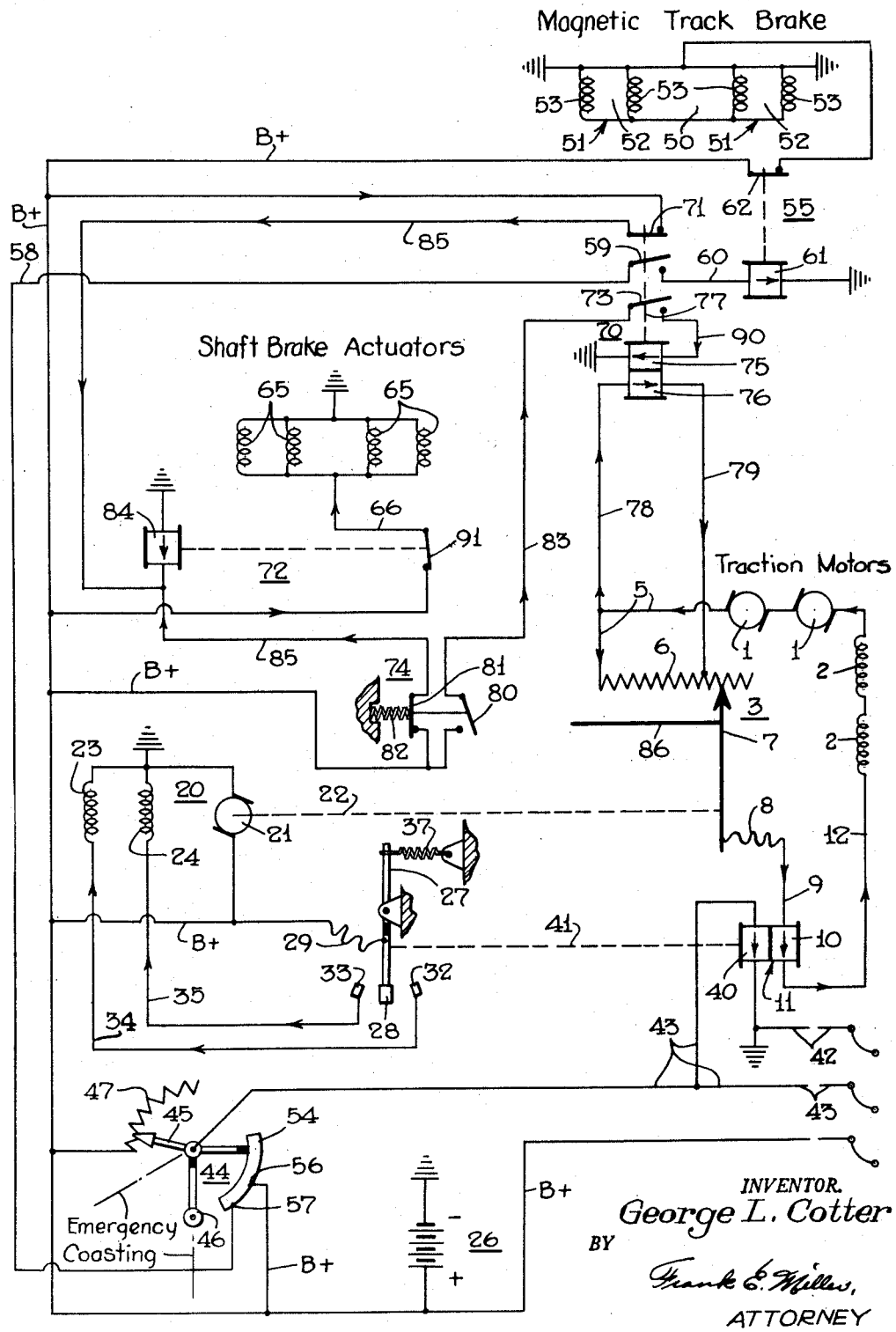

2,656,501

UNITED STATES PATENT OFFICE 2,656,501

INTERLOCKED CONTROL APPARATUS FOR COMBINED DYNAMIC, TRACK, AND SHAFT BRAKE EQUIPMENT

George L. Cotter, Pittsburgh, Pa., assignor to Westinghouse Air Brake Company, Wilmerding, Pa., a corporation of Pennsylvania Application September 26, 1951, Serial No. 248,415

5 Claims. (Cl. 318—367)

This invention relates to control apparatus for brake equipment and more particularly to interlocked control apparatus for an electric braking system employing electro-dynamic brakes, magnetic track brakes, and spring-applied solenoid-released shaft brakes on the driving shaft of an electric railway vehicle.

It is one object of the invention to provide apparatus for controlling operation of the above type of brake equipment such that an operator may effect a service application of dynamic brakes to initially reduce vehicle speed with the shaft brakes automatically applying to complete the stop of the vehicle as the dynamic braking fades at the lower speeds, and such that the operator may effect an emergency application of the dynamic brakes and the magnetic track brakes in unison to stop the vehicle.

It is another object of the invention to provide control apparatus with means automatically operative in response to accidental loss of dynamic braking to effect application of the track brakes for stopping the vehicle.

Other objects and advantages will become apparent from the following more detailed description of the invention taken in connection with the accompanying drawing in which the single figure is a schematic representation of the control apparatus embodying the invention as associated with a combined electro-dynamic, magnetic track, and shaft brake equipment which it controls.

*Description dynamic braking portion of combined brake equipment*

The dynamic braking portion of a combined brake equipment, such as above described, comprises traction motors, two pairs of which are usually employed on an electrically propelled vehicle such as a subway car, for example: one pair of motors being connected to driving axles (not shown) at one end of the car, and the other pair of motors (not shown) being connected to driving axles at the opposite end of the car. Such traction motors, in the well-known manner, when supplied with electrical energy, act to propel the car, and when deprived of such electrical energy and properly controlled, the same motors act as electric generators for dynamic braking of the car. Only the latter application of the traction motors is of concern to this invention, and any of the equipment concerned with control of such motors when operating as prime movers or with conditioning said motors to act as generators has not been included herein.

Insofar as the traction motors are employed for dynamic braking, each motor comprises, as shown in the drawing, respective armatures 1 and fields 2 connected in series. Both motors act as generators for dynamic braking and are adapted to be connected in series in a dynamic braking circuit which includes a dynamic braking control rheostat 3 for varying resistance to current flowing through the traction motor fields 2, for thereby controlling the dynamic braking effort of the motors acting as generators, in the well-known manner.

With a particular polarity of the traction motors acting as generators, current generated by these motors will flow in a direction indicated by the arrows shown in the drawing via a wire 5 into and through the usual resistance coils 6 and adjustable coil contact arm 7 of the rheostat 3, thence via an adjustable conductor 8 and wire 9 through a magnet coil 10 of a two-coil limit relay 11 (for reasons which will hereinafter become obvious in view of subsequent description) to return to the motors via a wire 12.

Movement of the contact arm 7 of the rheostat 3 relative to resistance coil 6 varies the amount of resistance in the dynamic braking circuit to regulate the current through the fields 2 of the traction motors acting as generators and thereby controls the degree of current generated at any given rotational speed of the armatures 1, hence control of the degree of dynamic braking at any given speed.

The apparatus for controlling operation of the rheostat 3 and thereby the dynamic braking operation of the traction motors comprises a reversible pilot motor 20 having the usual armature 21 with an operative connection, indicated by a dotted line 22, for actuating the contact arm 7 of rheostat 3. The pilot motor armature 21 will rotate in one direction or in its opposite direction in response to selective excitation of two shunt fields 23 or 24 for actuating the rheostat arm 7 to increase and decrease, respectively, resistance in the dynamic braking circuit to call for decrease and increase, respectively, in dynamic braking current through the traction motor fields to control dynamic braking force restraining rotation of the vehicle wheels.

For sake of illustration, a battery 26 may act as the source of electrical energy with which the pilot motor 20 is operated; the positive terminal of the battery being connected to a B+ supply wire and the negative terminal being connected to ground.

For controlling operation of the pilot motor 20, the two-coil limit relay 11 is employed. The relay 11 comprises a movable contact arm 27 carrying a contact 28 having an electrical connection with the B+ supply wire and one terminal of the pilot motor armature 21 by way of a conducting portion of the arm 27 and an adjustable conductor 29. The contact 28 is disposed between two fixed contacts 32 and 33 both of which are connected electrically to ground and the opposite pole of the pilot motor armature 21 by way of wires 34 and 35 and the pilot motor fields 23 and 24, respectively. A bias tension spring 37 is suitably connected to contact arm 27 to urge the movable contact 28 carried by said arm into engagement with fixed contact 33 to complete electrical circuit between the B+ supply, the pilot motor field 24 and armature 21 to cause operation of the pilot motor in a direction to reduce resistance of rheostat 3 to the dynamic braking circuit to call for an increase in dynamic braking current, as will be appreciated from previous description. Action of the spring 37 on the contact arm 27 is opposed by additive magnetic effort generated by flow of current through the two coils of the relay 11; coil 10 through which dynamic braking current flows, and a coil 40 to be described subsequently. Operative connection between the coils 10, 40 and the contact arm 27 is indicated in the drawing by a dash line 41.

One terminal of the coil 40 of the relay 11 is connected electrically to ground via such as a wire 42, while the opposite terminal of the coil 40 is connected via a wire 43 and a variable resistance to the B+ supply wire.

The variable resistance may form part of an operator's controller device 44 and, for sake of illustration, may comprise a contact arm 45 connected to wire 43 and movable by an operator's handle 46 relative to a resistance coil 47 connected to the B+ supply wire. By movement of the controller handle 46 from a "Coasting" position to or intermediate an "Emergency" position, the resistance imposed by coil 47 to flow of current from the B+ supply wire to ground via coil 40 in relay 11 may be varied to and/or between a minimum and a maximum amount, respectively.

*Operation of dynamic braking control*

In operation of the apparatus for controlling dynamic braking, which apparatus per se forms no part of the invention, assume: that the traction motors are connected electrically as shown in the drawing to act as generators for dynamic braking of the vehicle; that such vehicle is traveling at a rate of speed sufficiently great to be capable of effecting any degree of dynamic braking within its operating range; that the controller handle 46 is in "Coasting" position, in which it is shown in the drawing, with a minimum amount of resistance imposed by resistance coil 47 in the limit relay 11 coil 40 circuit so that a maximum amount of current from B+ supply will be flowing via wire 43 through said coil 40; and assume further that the contact arm 7 of the dynamic brake control rheostat 3 is positioned to call for a certain minimum and coasting rate of dynamic braking current and effort to be developed by rotation of the traction motor armatures 1 by virtue of excitation of the fields 2 by such current.

The dynamic braking current generated at the minimum or coasting rate will flow via rheostat 3 and wires 8, 9 and 12 in the dynamic braking circuit through the coil 10 in the limit relay 11, the coil 40 of which is being energized to maximum extent via controller 44. At this time, the coasting rate of current flowing through the coil 10 of the limit relay 11 and the rate flowing through the coil 40 of the same relay, by virtue of the design and arrangement of these coils to summarize their magnetic efforts, develop sufficient total magnetic effort acting via connection 41 on arm 27 to balance the opposing action of spring 37 on said arm and hold the arm in the position in which it is shown in the drawing with the movable contact 28 carried by said arm disposed intermediate fixed contacts 32 and 33 so that the pilot motor 20 will not be in operation, with the contact arm 7 of the dynamic braking control rheostat 3 remaining static in proper position as assumed.

Assume now that it is desired to effect a dynamic brake application in some particular desired degree. The operator will move the controller handle 46 to a position out of "Coasting" toward "Emergency" in accord with the degree of dynamic brake application desired, thereby positioning the contact arm 45 relative to coil 47 correspondingly to increase the resistance to flow of current to the limit relay coil 40, with consequential reduction in such current, resulting momentarily in a loss in total magnetic effort imposed by the two coils on arm 27 to oppose action of spring 37. The spring 37 thus will be rendered effective to move arm 27 such that contact 28 is carried into engagement with fixed contact 33 to call for operation of the pilot motor 20 in a direction which moves the contact arm 7 for reducing the resistance of rheostat 3 presented to the dynamic braking circuit, thereby allowing more current to flow through the fields 2 of the traction motors to increase the amount of dynamic braking experienced by the vehicle wheels driving the motor armatures. Such increase in dynamic braking current will be experienced in the coil 10 of the limit relay 11 and results in increase in total magnetic effort generated in opposition to action of spring 37 on the contact arm 27 until the effect of the magnetic force from coils 10 and 40 acting on arm 27 balances the effect of spring 37 on said arm, at which time the arm again assumes a neutral position in which the contact 28 is disposed intermediate the contacts 32 and 33 to terminate operation of the pilot motor 20 and further adjustment of the dynamic braking control rheostat 3.

If a subsequent decrease in degree of dynamic braking is desired by the operator, he will move the controller handle 46 back toward "Coasting" position, thus moving the contact arm 45 in a direction calling for imposition of a lesser amount of resistance of coil 47 to the circuit through the limit relay coil 40 with resultant increase in current flow through said coil. With such increase in current, the total magnetic effort generated in the limit relay will increase and cause unbalance of forces acting on contact arm 27 with resultant movement of said arm in opposition to spring 37 to cause engagement between movable contact 28 and fixed contact 32 to call for operation of the pilot motor 20 in the direction which moves contact arm 7 to increase the amount of resistance imposed by rheostat 3 to the dynamic braking circuit. Such movement of arm 7 by the pilot motor 20 will persist until the resultant reduction in dynamic braking current flowing through the coil 10 of the limit relay 11 again establishes equilibrium of forces acting on arm 27, whereupon said arm again assumes its neutral position to shut off the pilot motor and terminate further adjustment of the dynamic brake controlling rheostat 3.

The aforedescribed apparatus for controlling dynamic braking will automatically respond to effect adjustment of the dynamic brake control rheostat 3 in effort to maintain a constant degree of dynamic brake application as the traction motor armatures decelerate under influence of the restraining force imposed by braking opposing rotation of the vehicle wheels. Such reduction in rotational speed of the traction motor armatures, resulting in a decrease in dynamic braking current and effort generated, experienced in coil 10 of the limit relay 11 results in a reduction in total magnetic effort generated in said relay and consequential unbalance in forces acting on the contact arm 27 in favor of the spring 37 which will move said arm to cause engagement between contacts 28 and 33 for operating the pilot motor 20 in the direction for reducing resistance of rheostat 3 presented to the dynamic braking circuit in behalf of rendering the traction motors capable of generating the desired dynamic braking current and effort at the reducing rotational speeds of the traction motor armature 1 in accord with dictates of the controller 44. Once such increase in dynamic braking current at reducing rotational speeds of the traction motor armatures again reaches a value sufficient to reestablish equilibrium of forces acting on contact arm 27 of the limit relay 11, the spring 37 will move said arm to its intermediate position to terminate operation of the pilot motor 20 and thereby terminate further adjustment of the dynamic braking control rheostat 3 until subsequent unbalance of forces on limit relay arm 27 resulting from continued reduction in rotational speed of motor armatures 1 again exists, whereupon the limit relay 11 will again respond as above described to operate the pilot motor 20 for moving the contact arm 7 of the dynamic braking control rheostat 3 in the direction for decreasing resistance in the dynamic braking circuit in effort to maintain a degree of dynamic braking in accord with position of controller handle 46. Once successive adjustment of the rheostat 3 results in cut out of all or substantially all rheostat resistance in the dynamic braking circuit, it will be appreciated that continued reduction in rotational speed of the motor armatures 1 will result in a continued reduction in generated dynamic braking current and hence continued reduction in dynamic braking effort, since compensation by reducing rheostat resistance in the dynamic braking circuit has reached its limit at full cut-out, and dynamic braking current and effort can no longer be maintained in accord with position of controller handle 46. Such continued reduction in dynamic braking subsequent to full cut-out of the resistance of the dynamic braking control rheostat 3 will hereinafter be referred to as fading out of dynamic braking, and the condition at which such begins to occur will hereinafter be referred to as the "fade-out point" of dynamic braking, and such fade-out point will coincide, assuming integrity of operation of the pilot motor 20, with the contact arm 7 of the dynamic brake controlling rheostat 3 attaining its limit of travel with full cut-out of rheostat resistance in the dynamic braking circuit.

*Description of magnetic track brake portion of combined brake equipment*

For sake of illustration, schematically, the magnetic track brake comprises a plurality of the usual track brake shoes, a single shoe 50 of which is shown in the drawing, carried by a suitable member of the vehicle truck (not shown) and adapted to be urged by suitably attached electro-magnets 51 into frictional engagement with the upper surface of the rails (not shown) on which the vehicle travels.

The electro-magnets 51 for operating the track brakes simply comprises the usual metal core 52 adapted to be energized to generate a force attracting it toward the steel rail by electric current supplied to a coil or coils 53.

In accord with desired features of the combined brake equipment, the manget coils 53 of the track brake are adapted to be supplied with energizing current from the B+ supply wire to effect application of the magnetic track brakes to assist dynamic braking of the vehicle when the operator moves the controller handle 46 to "Emergency" position.

In "Emergency" position of the controller handle 46, a switch 54 actuated by movement of said handle effects operation of a track brake control relay 55 to establish connection between B+ and the magnet coils 53 which are grounded on the outlet side so that energizing current will flow therethrough to effect track brake application.

In all positions of controller handle 46 other than "Emergency" position, the track brake control switch 54 will bridge a pair of fixed contacts 56 and 57 to establish electrical connection between a branch of the B+ supply wire and a wire 58, connected via a closed lockout relay switch 59 during a dynamic brake application (as will hereinafter become apparent from subsequent description) and a wire 60 to one terminal of a coil 61 of the track brake control relay 55. The opposite terminal of coil 61 being constantly connected to ground, such that supply of current to wire 60 will energize said coil to hold a switch 62 of said relay open and interrupting connection between the magnetic track magnet coils 53 and B+ supply, so that the track brakes will remain released.

Once the controller handle 46 is caused to assume its "Emergency" position, the track brake control switch 54 will leave the contacts to terminate supply of B+ current via wire 58, lockout relay switch 59, closed during normal dynamic braking, and wire 60 to deenergize coil 61 of track brake control relay 55 to close switch 62 thereby effecting supply of current from B+ to energize the magnet coils 53 for a track brake application in assist to the normal maximum dynamic brake application in existence at the time.

*Description of shaft brake portion of combined brake equipment*

The shaft brake portion of the combined brake equipment may comprise the usual brake drum (not shown) suitably attached to rotate with such as the driving axle (not shown) on the vehicle. The usual brake shoes (not shown) are suitably arranged for frictional engagement with the drum to brake the axle for decelerating the vehicle. Such brake shoes are arranged to be actuated into engagement with the drum by the stored energy given up by release of a precompressed spring or springs (not shown). For controlling extension and compression of the application springs on the shaft brake, solenoids 65 shown only symbolically in the drawing are provided. One side of the solenoids 65 is connected to a wire 66 common to each while the outlet sides of said solenoids are grounded so that by supply of electrical energy to wire 66 the solenoids are energized and termination of such supply will deenergize. The solenoils are so adapted and arranged with respect to the brake application springs that said solenoids when energized will compress the springs to release the shaft brake, and when deenergized will allow extension of the precompressed springs to apply the shaft brake.

*Description of the interlocked control apparatus for the combined dynamic, track, and shaft brake equipment*

The interlocked control apparatus embodying the invention comprises a two-coil lockout relay 70 having the switch 59 for controlling operation of the track brake control relay 55, a switch 71 for controlling operation of a shaft brake control relay 72, and a switch 73 which cooperates with a switch device 74 to control a lock-up feature of the lock-out relay 70.

The lockout relay 70 comprises two coils 75 and 76 both of which aret operatively connected to the three switches 71, 59 and 73 as indicated in the drawing by a dash line 77.

The coil 76 is constantly connected into an electrical circuit by means of wires 78 and 79 in such fashion as to receive a portion of the dynamic braking current generated by the traction motors during their operation as generators for effecting dynamic braking of the vehicle; for example, wires 78 and 79 may be tapped across the dynamic braking control rheostat resistance coil 6, as shown in the drawing, to cause a portion of the current supplied the dynamic braking circuit to flow through lockout relay coil 76. At any degree of dynamic braking current and effort generated by the traction motors by movement of the vehicle in accord with position of controller handle 46 from the minimum "Coasting" rate to the maximum 'Emergency" rate, sufficient dynamic braking current will flow via wires 78 and 79 through the lockout relay coil 76 to hold the switches 71, 59, and 73 in positions opposite to that in which they are shown in the drawing, that is, open, closed, and closed, respectively. At some reduced speed of the vehicle within the fade out range of dynamic braking, the dynamic braking current will become reduced to such an extent that the portion of such dynamic braking current flowing through the lockout relay coil 76 will be insufficient to hold the switches 71, 59, and 73 open, closed and closed, respectively, and when the other lockout relay coil 75 is de-energized at this time, said switches 71, 59 and 73 will all assume the positions in which they are shown in the drawing, closed, open and open, respectively.

The switch device 74 comprises, for sake of illustration, two mechanically connected switches 80 and 81 which are biased to open and closed positions, respectively, in which positions they are shown in the drawing, by action of a compression spring 82. The switch 80 controls connection of the B+ supply wire to one contact of the lockout relay switch 73 via a wire 83 and the switch 81 controls connection of the B+ supply wire to a wire 85 a branch of which is connected to a contact of the lockout relay switch 71 and another branch of which is connected to one terminal of shaft brake control relay coil 84, the opposite terminal of which coil is grounded. Switches 80 and 81 are actuated to closed and open positions, respectively, by movement of a switch actuator element 86 carried by the movable contact arm 7 of the dynamic braking control rheostat 3 as said arm approaches its full cut-out position corresponding to the fade out point of dynamic braking as aforedescribed in which a minimum amount of resistance of coil 6 is presented to the dynamic braking circuit. In all other positions of rheostat contact arm 7, actuator element 86 will be disposed away from switches 80 and 81, allowing spring 82 to hold said switches in their open and closed positions, respectively.

In the lockout relay device 70, the contact in switch 73 opposite to the one connected to wire 83 is connected to one terminal of the lockout relay coil 75 via a wire 90, the opposite terminal of said coil being grounded.

The shaft brake control relay 72 comprises the usual switch 91 operably connected to the aforementioned coil 84. One contact of switch 91 is connected to B+ supply while the opposite contact is connected to the wire 66 leading to the shaft brake solenoids 65. Energization of the relay coil 84 in response to supply of current to wire 85 will close switch 91, while de-energization of said coil in response to termination of such supply will cause said switch to assume the open position in which it is shown in the drawing.

*Operation*

Assume that the controller handle 46 is in some position intermediate "Coasting" and "Emergency" with associated switch 54 connecting wire 58 to B+ supply and that a degree of dynamic braking current and effort in accord with handle position to be in development by rotation of the traction motor armatures 1 driven by rotation of the vehicle wheels thus being braked dynamically, as hereinbefore described. Assume also that the speed of the vehicle is such that the fade out point of dynamic braking has not been reached, and the position of the pilot-motor operated, dynamic braking rheostat contact arm 7 to be in some position beyond its full cut-out position so that actuator element 86 carried by said arm is disposed away from switches 80 and 81 in device 74, which switches 80 and 81 consequently will be held by spring 82 in their open and closed positions, respectively.

In consequence of flow of current through the dynamic braking circuit 5, 6, 7, 8, 9, 10, 12, 2, 1, a portion of such current flowing via wires 78, 79 through the coil 76 in lockout relay 70 will hold switches 71, 59, and 73 in the positions opposite to those positions in which they are shown in the drawing; open, closed, and closed, respectively.

With lockout relay switch 71 open, B+ supply is disconnected from the respective branch of wire 85.

The closed lockout relay switch 59 connects the wire 58 to wire 60 so that current from B+ supply will be flowing via the switch 54 in controller 44, through said wire 58, through said closed switch 59, and said wire 60 through track brake control relay coil 61 to ground, thereby maintaining energization of said coil 61 for holding switch 62 open to maintain disconnection of the de-energized track brake coils 53 from B+ supply so that the track brake remains released.

The closed lockout relay switch 73 connects the wire 90 from the lockout relay coil 75 to the wire 83, which is disconnected from B+ at this time by the open switch 80, so that said lockout relay coil 75 will remain de-energized at this time.

The closed switch 81 in device 74 connects B+ supply to the wire 85 for energizing the coil 84 in the shaft brake control relay 72 to hold switch 91 closed, thereby connecting wire 66 to B+ supply for energizing solenoids 65 to hold the spring applied shaft brake on the vehicle released.

Now assume the vehicle speed to be reduced to the extent that dynamic braking current is on the verge of fade out, with the pilot motor 20 operating in response to dictates of the limit relay 11 as hereinbefore described to move the dynamic brake controlling rheostat arm 7 toward its full cutout position, thereby causing engagement of actuator element 86 with switch 80 causing its closure and opening of switch 81 at a time just prior to dynamic brake fade out.

Closure of the switch 80 will connect B+ supply to the wire 83 so that current will flow via the closed lockout relay switch 73 and wire 90 to energize the lockout relay coil 75 for holding switches 71, 59, and 73, open, closed, and closed, respectively, as dynamic braking current flowing through lockout relay coil 76 falls off with subsequent fade out of dynamic braking.

Opening of switch 81 as above disconnects the wire 85 from B+ supply so that the shaft brake control relay coil 84 becomes de-energized, lockout relay switch 71 remaining open, with resultant opening of switch 91 to deenergize solenoids 65 and allow stored spring force to apply the shaft brakes to bring the vehicle to a stop with assist of the fading dynamic brakes.

At any time during dynamic braking or during shaft braking, as the dynamic braking fades out as above described, application of the magnetic track brake may be effected in addition by movement of the controller handle 46 to "Emergency" position to position the associated switch 54 to disconnect wire 58 from B+ supply so that the track brake control relay coil 61 connected via wire 60 and the closed lockout relay switch 59 will become de-energized and cause closure of switch 62 for connecting B+ to the magnet coils 53 of the track brake for applying same in fashion as previously described.

Now assume again that the vehicle is in motion and that a certain degree of dynamic braking current to be in development by rotation of the traction motor armatures 1 driven by the vehicle wheels, and that such degree of dynamic braking current is in accord with position of the controller handle 46 between "Coasting" and "Emergency" so that the pilot-motor-operated dynamic-braking-control-rheostat contact arm 7 will be in a position in which the actuator element 86 carried by said arm is disposed away from switch 80 in device 74 so that spring 82 will be holding switch 81 closed and switch 80 open.

Under such conditions the apparatus will be conditioned as aforedescribed, with dynamic braking current through lockout relay coil 76 holding switches 71, 59, and 73 in lockout relay 70 open, closed, and closed, respectively. With switch 81 closed, the shaft brake control relay coil 84 will be energized via wire 85 to hold switch 91 closed to connect B+ supply to wire 66 for energizing the release solenoids 65 of the shaft brake.

With lockout relay switch 73 closed, the wire 90 connected to the lockout relay coil 75 will also be connected to the wire 83 which is disconnected from B+ by the open switch 80 so that said lockout relay coil 75 will be de-energized.

With the lockout relay switch 59 closed, B+ supply from the controller switch 54 is connected to energize the coil 61 of track brake control relay 55 to hold switch 62 open so that the magnetic track brake will be maintained released.

Now assume that dynamic braking fails suddenly, due to accidental opening of the dynamic braking circuit for example, the instantaneous loss in dynamic braking current will result in sudden de-energization of the lockout relay coil 76 before the pilot motor 20 has time to move the dynamic braking control rheostat arm 7 to full cut-out position in response to unbalance of the limit relay 11 by the complete loss of dynamic braking current in limit relay coil 10, with the result that the lockout relay 70 will respond to close switch 71 and open switches 59 and 73 prior to closing and opening of switches 80 and 81 by actuator element 86 carried with the arm 7.

Opening of the lockout relay switch 59 in response to the sudden and complete loss of dynamic braking current flowing through lockout relay coil 76 will effect deenergization of the track brake control relay coil 61 to close switch 62 for connecting the magnet coils 53 to B+ supply and thereby applying the magnetic track brakes to bring the vehicle to a stop in absence of dynamic braking.

The simultaneous closure of the lockout relay switch 71 with the sudden deenergization of lockout relay coil 76 in absence or dynamic braking current will connect wire 85 to B+ supply to maintain energization of the shaft brake control relay coil 84 in event of subsequent opening of switch 82 by return of the rheostat arm 7 to its full cut-out position, thereby holding switch 91 closed to maintain energization of solenoids 65 for holding the spring applied shaft brakes released during the track brake application.

The lockout relay switch 73, in opening with the aforementioned sudden loss of dynamic braking energizing current in lockout relay coil 76, prevents energization of the lockout relay coil 75 upon the subsequent closure of switch 80 by the dynamic braking control contact arm 7 upon movement by pilot motor 20 to its full cut-out position.

Assume again that a dynamic brake application is in effect with the system conditioned as aforedescribed, that is, that dynamic braking current is energizing the lockout relay coil 76 to hold lockout relay switches 59 and 73 closed and switch 71 open.

The closed switch 59 will be in completion of circuit from B+ via controller switch 54, with handle 46 intermediate "Coasting" and "Emergency," and via the wires 58 and 60 through track brake control relay coil 61, energizing said coil to hold switch 62 open to maintain release of the magnetic track brakes on the vehicle.

The closed switch 73 connects wires 83 and 90 one with the other, but lockout relay coil 75 will be deenergized by virtue of the open switch 80 with actuator element 86 carried by the dynamic braking control rheostat contact arm 7 disposed away from said switch as previously assumed.

Switch 81 will be in its closed position in which it is shown in the drawing connecting energizing current from B+ supply to the shaft brake control relay coil 84 holding the switch 91 closed for completing circuit between B+ supply and the solenoids 65 to maintain release of the spring applied shaft brakes.

Now assume that the pilot motor circuit fails and the pilot motor 20 is ineffective to move the dynamic brake control contact arm 7, which arm will remain in some position such as that in which it is shown in the drawing out of its full cut-out position. As the vehicle slows down under influence of dynamic braking, the traction motors will tend to become less effective with resulting gradual reduction in dynamic braking current, and since the contact arm 7 of rheostat 3 remains static and is helpless to compensate for such gradual loss in dynamic braking current, a premature fade-out of dynamic braking will occur.

When such premature fading results in a reduction in dynamic braking current which otherwise would occur under normal operating conditions susbtantially at full cut-out position of rheostat arm 7, the lockout relay coil 76 will respond to allow switch 71 to close and switches 59 and 73 to open, with switches 80 and 81 remaining open and closed, respectively, by spring 82 in absence of actuation by element 85 attached to the static rheostat arm 7.

Opening of lockout relay switch 59 will effect deenergization of the track brake control relay coil 61 to close switch 62 and connect B+ supply to the magnet coils 53 for applying the magnetic track brakes to bring the vehicle to a stop in assist of the prematurely fading dynamic brakes with failure of operation of the pilot motor 20.

The closed switch 81 and/or the closed lockout relay switch 71 will maintain the shaft brake control relay coil 84 energized to hold switch 91 closed for maintaining release of the spring applied shaft brakes by continued energization of the release solenoids 65.

If, at the time that a dynamic brake application is called for such application fails to materialize, lack of generation of dynamic braking current will result in failure of the lockout relay 70 to close switch 59 since lockout relay coils 75 and 76 both will be deenergized at the time, with the result that the track brake control relay coil 61 will be energized holding switch 62 closed to supply energizing current from B+ supply to the magnet coils 53 for effecting application of the track brakes in lieu of the dynamic brakes. Under such circumstances, the closed switch 71 will assure continued energization of the shaft brake control relay coil 84 to maintain switch 91 closed and the release solenoids of the spring applied shaft brakes energized to hold off application even though operation of the pilot motor 20 might cause switch 81 to open.

*Summary*

It will now be appreciated that I have provided interlocked control apparatus for an electric braking system employing electro-dynamic brakes, magnetic track brakes, and spring-applied, solenoid-released shaft brakes for decelerating a railway vehicle.

It will be appreciated that such control apparatus comprises means whereby a service application of dynamic brakes may be effected by an operator to initially reduce the speed of the vehicle with automatic application of the shaft brakes to assist the fading dynamic brakes to bring the vehicle to a stop.

Also it will be appreciated that the control apparatus comprises means automatically responsive to accidental loss of dynamic brakes to apply the track brakes for stopping the vehicle, while maintaining the shaft brakes released.

Still further, means are comprised in the control apparatus to enable an operator to effect application of the magnetic track brakes to assist the dynamic brakes and/or the shaft brakes when desired.

Having now described my invention, what I claim as new and desire to secure by Letters Patent, is:

1. Apparatus for controlling operation of track brakes, shaft brakes and dynamic brakes on a railway vehicle, comprising in combination, means to effect application of dynamic brakes, shaft brake control means operable upon normal fadeout of the dynamic brakes to apply the shaft brakes, track brake control means operable upon sudden loss of dynamic braking to apply the track brakes, first interlock means operable upon operation of the shaft brake control means to prevent operation of the track brake control means, and second interlock means operable upon operation of the track brake control means to prevent operation of the shaft brake control means.

2. A brake system for a vehicle, comprising spring applied shaft brakes, solenoid means energizable to release said shaft brakes, a source of electrical energy, relay means energizable and de-energizable to connect and disconnect, respectively, said solenoid means to and from said source, electro-dynamic brake means including an armature driven by wheels of said vehicle and a series field in a dynamic braking circuit, a dynamic brake controlling rheostat connected in series in said dynamic braking circuit and including a contact arm movable to and between a maximum resistance position and a minimum resistance position to vary amount of control resistance in said dynamic braking circuit correspondingly, switch means operable to closed and open positions to complete and interrupt, respectively, electrical circuit between said relay means and said source, bias means urging said switch means toward its closed position, and an actuating element associated with said contact arm to open said switch means as said contact arm approaches its minimum resistance position.

3. A brake system for a railway vehicle, comprising track brakes, magnet coils energizable and de-energizable to apply and release, respectively, said track brakes, a source of electrical energy, a track brake control switch, for controlling electrical circuit between said magnet coils and said source, track brake control coil means energizable and de-energizable to open and close, respectively, said track brake control switch, a control wire, an electro-dynamic braking circuit, a dynamic braking controller device having a handle operable to and between minimum and maximum dynamic braking positions and including switch means establishing electrical connection of said control wire to said source in all positions of said handle with exception of maximum dynamic braking position in which said switch means is open to disestablish said electrical connection, a lockout relay switch for controlling electrical circuit between said track brake control coil means and said control wire, and lockout relay coil means energized by current from said dynamic braking circuit to hold said lockout relay switch closed during dynamic braking and to open said lockout relay switch upon sudden total loss in dynamic braking.

4. A brake system for a railway vehicle, comprising spring applied shaft brakes, solenoid means energizable to release said shaft brakes, track brakes, magnet coils energizable and de-energizable to apply and release, respectively, said track brakes, dynamic brakes including an armature driven by wheels of said vehicle and a series field in a dynamic braking circuit, a source of electrical energy independent of said dynamic braking circuit, a shaft brake control switch controlling electrical circuit between said solenoid means and said source, shaft brake control coil means energizable and de-energizable to close and open, respectively, said shaft brake control switch, a track brake control switch controlling electrical circuit between said magnet coils and said source, track brake control coil means energizable and de-energizable to open and close, respectively, said track brake control switch, a dynamic brake controlling rheostat connected in series in said dynamic braking circuit and including a resistance contact arm movable to and between a maximum resistance position and a minimum resistance position to vary amount of control resistance in said dynamic braking circuit correspondingly, a first lockout relay switch controlling electrical connection between said shaft brake control coil means and said source, a control wire, a second lockout relay switch controlling electrical connection between said track brake control coil means and said control wire, a third lockout relay switch, first lockout relay coil means effectively energized upon receipt of electrical energy from said source and de-energized by termination of such receipt, second lockout relay coil means energized in response to flow of a certain degree of dynamic braking current in said dynamic braking circuit and de-energized in response to reduction in dynamic braking current in said dynamic braking circuit below said certain degree, electrical conducting means connecting said first lockout relay coil means to the outlet side of said third lockout relay switch means, a first interlock switch controlling electrical connection between said source and the input side of said third lockout relay switch, a second interlock switch controlling electrical connection between said shaft brake control coil means and said source, bias means urging said first interlock switch and second interlock switch to open and closed positions, respectively, actuating means operative to close said first interlock switch and open said second interlock switch only upon said resistance contact arm attaining its minimum resistance position, dynamic brake control means automatically positioning said resistance contact arm in effort to maintain a degree of dynamic braking current in accord with position of a controller handle movable between coasting and emergency positions according to degree of dynamic braking required, and switch means associated with said dynamic brake control means to disconnect and connect said control wire to said source according to whether said controller handle is in its emergency position or not in its emergency position, respectively.

5. In a brake system for a vehicle comprising electrodynamic brakes and other brakes, the combination of relay means to control operation of said other brakes, switch means to control operation of said relay means, dynamic brake control means including a rheostat coil and contact arm movable responsively to reduction in dynamic braking current resultant from reduction in vehicle speed to a limit position coincident with the fade-out point of said dynamic brakes, and an actuating element associated with said contact arm for movement therewith and into operative engagement with said switch means to effect operation of said relay means to cause application of said other brake means as said contact arm approaches its said limit position.

GEORGE L. COTTER.

References Cited in the file of this patent

UNITED STATES PATENTS

| Number | Name | Date |
|---|---|---|
| 2,066,920 | Willby et al. | Jan. 5, 1937 |
| 2,078,648 | Willby | Apr. 27, 1937 |
| 2,257,302 | Larson | Sept. 30, 1941 |
| 2,366,029 | Hines | Dec. 26, 1944 |
| 2,368,726 | Piron | Feb. 6, 1945 |